United States Patent [19]

Miksitz

[11] Patent Number: 4,998,596
[45] Date of Patent: Mar. 12, 1991

[54] SELF-PROPELLED BALANCING THREE-WHEELED VEHICLE

[75] Inventor: Frank J. Miksitz, Phillipsburg, N.J.

[73] Assignee: UFI, Inc., Phillipsburg, N.J.

[21] Appl. No.: 346,907

[22] Filed: May 3, 1989

[51] Int. Cl.$^5$ ................... B60G 5/02; B60K 17/00
[52] U.S. Cl. ................... 180/213; 180/307; 280/6.11; 280/112.2
[58] Field of Search ............... 180/213, 216, 211, 212, 180/215, 308, 307; 280/6.11, 112.2, 112.1, 111, 421

[56] References Cited

U.S. PATENT DOCUMENTS

| | | | |
|---|---|---|---|
| 2,435,021 | 1/1948 | Seider | 180/215 |
| 2,503,106 | 4/1950 | Fritz | 280/6.11 |
| 2,539,490 | 1/1951 | Smith | 180/308 |
| 2,583,250 | 1/1952 | Ball | 280/6.12 |
| 2,767,800 | 10/1956 | Joy | 180/213 |
| 2,771,145 | 11/1956 | Peters | 180/213 |
| 2,820,524 | 1/1958 | Bear | 180/213 |
| 2,954,833 | 10/1960 | Davidson | 280/6.11 |
| 3,060,818 | 10/1962 | Roberts | 280/6.11 |
| 3,184,867 | 5/1965 | Symmank | 280/6.11 |
| 3,198,277 | 8/1965 | Trivero | 280/6.12 |
| 3,279,823 | 10/1966 | Thouvenelle | 280/421 |
| 3,480,098 | 11/1969 | Ward, Jr. | 280/6.11 |
| 3,572,456 | 3/1971 | Healy | 280/112.2 |
| 3,698,502 | 10/1972 | Patin | 180/215 |
| 3,707,199 | 12/1972 | Gerich et al. | 280/6.11 |
| 3,712,404 | 1/1973 | Walquist | 180/306 |
| 3,738,440 | 6/1973 | Storm | 180/213 |
| 3,788,415 | 1/1974 | Tilley | 180/213 |
| 3,806,141 | 4/1974 | Louis et al. | 280/6.11 |
| 3,899,037 | 8/1975 | Yuker | 180/6.48 |
| 3,901,339 | 8/1975 | Williamson | 180/307 |
| 3,916,544 | 11/1975 | Swisher, Jr. et al. | 280/6.11 |
| 3,964,563 | 6/1976 | Allen | 280/6.11 |
| 4,046,211 | 9/1977 | Allen | 280/6.11 |
| 4,087,104 | 5/1978 | Winchell et al. | 280/210 |
| 4,088,199 | 5/1978 | Trautwein | 180/209 |
| 4,117,899 | 10/1978 | Sagaser | 180/307 |
| 4,126,322 | 11/1978 | Mika | 280/6.11 |
| 4,361,203 | 11/1982 | Buschbom | 180/213 |
| 4,484,648 | 11/1984 | Jephcott | 180/210 |
| 4,546,997 | 10/1985 | Smyers | 280/772 |
| 4,600,216 | 7/1986 | Burkholder | 280/772 |

*Primary Examiner*—David M. Mitchell
*Attorney, Agent, or Firm*—Fisher, Christen & Sabol

[57] ABSTRACT

A self-propelled, three-wheeled vehicle includes a power-driven single front wheel used also for steering the vehicle and two transversely spaced apart rear wheels. The front wheel is rotatably mounted on a front frame which is pivotally connected to a rear frame to allow steering movement of the front frame. The rear wheels are connected to the rear frame, which supports the rider or riders, by a parallelogram-type balancing linkage which allows the vehicle frames and the rider to lean into turns and also to remain upright when the vehicle passes over or is parked on laterally inclined terrain. The front wheel is driven by one or more hydraulic motors supported by the front frame. Hydraulic pressure to the motor(s) is supplied from an engine-driven pump assembly supported by the rear frame.

5 Claims, 2 Drawing Sheets

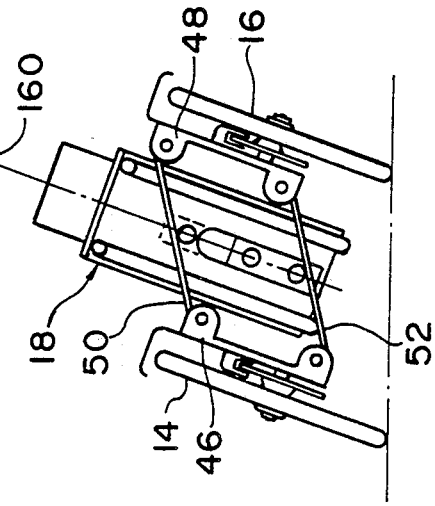
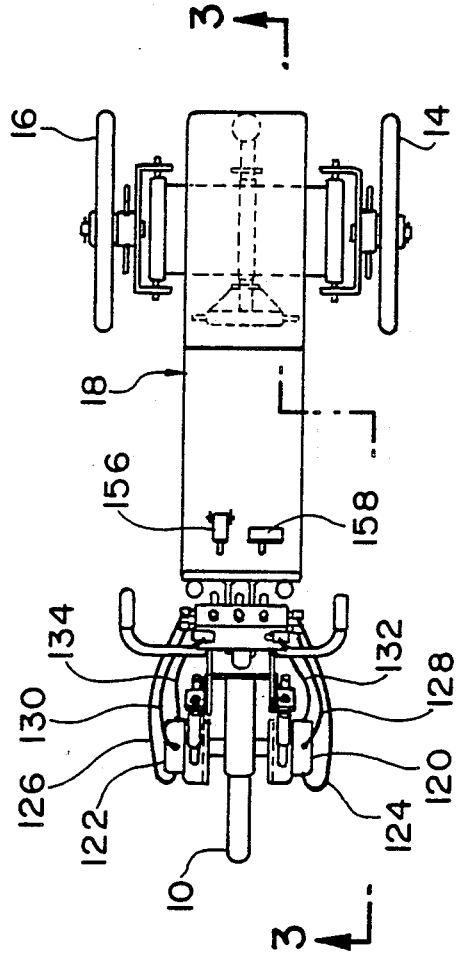
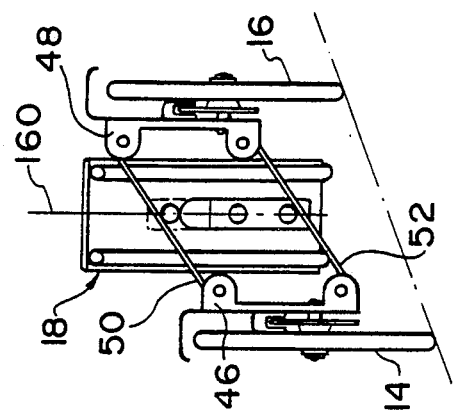
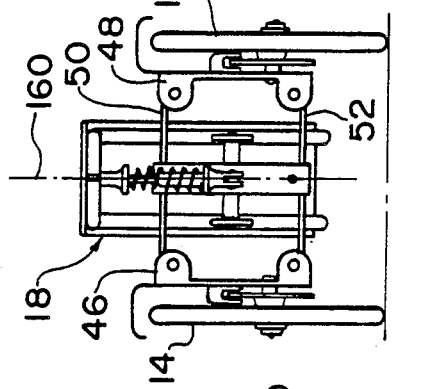
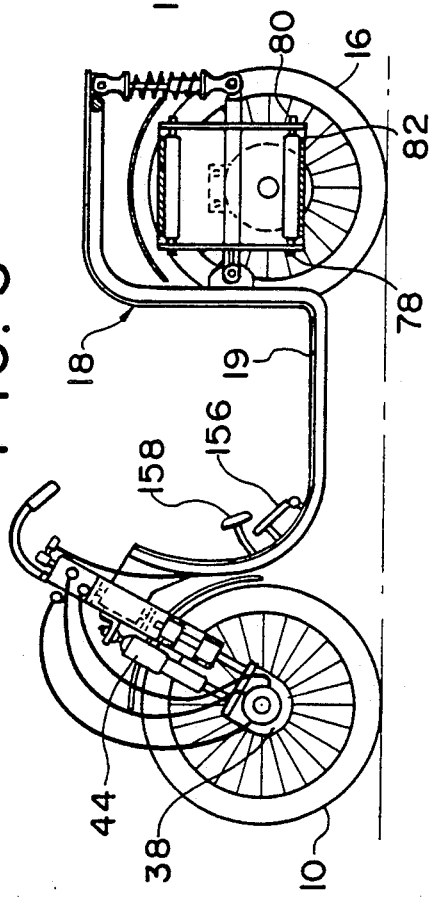

SELF-PROPELLED BALANCING THREE-WHEELED VEHICLE

This invention relates to a self-propelled, three-wheeled vehicle having a front steering wheel, two rear wheels and a parallelogram-type suspension system for the latter which allows a predetermined relative movement between the rear frame and the rear wheels as the vehicle makes a turn or travels along a laterally sloping incline, so that the rider can lean into turns and also remain upright when passing over laterally sloping terrain. The invention also relates to such a vehicle wherein the front wheel is driven by one or more hydraulic motors mounted on the front frame which carries the front wheel, with the hydraulic pump and the engine for driving the same being carried by the rear frame which also carries the rider or riders.

BACKGROUND OF THE INVENTION

The broad concept of tiltably mounting wheels which are carried on opposite sides of a three-wheeled vehicle is not new and is disclosed, for example, in U.S. Pat. Nos. 3,480,098, 4,088,199 and 4,126,322. As used herein, the term 'three-wheeled vehicle' includes a vehicle having two coaxial, transversely spaced apart wheels making two distinct points of engagement with the ground and a third wheel assembly longitudinally spaced from the latter two wheels and providing in effect a single-point engagement with the ground, even though this third wheel assembly may have plural closely spaced, coaxial wheels.

U.S. Pat. No. '098 discloses a three-wheeled tractor having a single front wheel steering assembly, two transversely spaced-apart rear drive wheels and an actuator-controlled levelling system for the latter which effects levelling of the tractor body about its longitudinal axis when the tractor operates on laterally inclined terrain, i.e. terrain which is inclined at an angle other than a straight angle relative to a normally horizontal ground plane.

U.S. Pat. No. '199 discloses a motorcycle-type vehicle having a single power-driven rear wheel assembly, two transversely spaced apart front steering wheels and a parallelogram-type balancing suspension linkage connected between the frame and the front wheels for allowing tilting movement between those wheels and the frame while the vehicle travels along or is parked on a laterally sloping incline or while the vehicle negotiates a turn at substantial forward speed. The tilting movement allows the frame and hence the body connected to the frame to remain substantially upright as the vehicle travels along a hillside, and it also allows the frame and hence the body to tilt relative to a horizontal plane, i.e. the ground, when the vehicle negotiates a turn; in both modes of operation, the wheels and the longitudinal vertical plane of the vehicle body remain parallel. No actuator for the suspension system is provided; tilting movement is effected by shifting of the operator's body.

U.S. Pat. No. '322 discloses a three-wheeled vehicle having a single power-driven rear wheel assembly, which is also used to steer the vehicle, and two transversely spaced apart front wheels which are connected to a vehicle frame by a parallelogram-type balancing suspension linkage providing tilting movement similar to that described above with respect to U.S. Pat. No. '199, except that in U.S. Pat. No. '322 control of the balancing system is effected by an actuator.

The broad concept of a three-wheeled vehicle having a driven single front wheel assembly is also known. For example, U.S. Pat. Nos. 2,503,106, 2,767,800 and 2,771,145 disclose such vehicles in which the front wheel is mechanically driven by an internal combustion engine, and U.S. Pat. No. 2,820,524 discloses such a vehicle in which the power source for the front wheel is a hydraulic motor.

SUMMARY OF THE INVENTION

According to the principles of the present invention there is provided a three-wheeled, self-propelled vehicle having a front, ground-engaging, driven steering wheel, two transversely spaced apart rear wheels and a parallelogram-type suspension linkage connected between the latter and a rear vehicle frame such that the rear frame and the rider or riders carried thereon can lean into turns and remain upright when passing over laterally sloping terrain. In the preferred construction, the power drive train comprises a hydraulic pump driven by an internal combustion engine, both the pump and the engine being carried by the rear vehicle frame, and a hydraulic motor or motors carried by the yoke, fork or other front frame assembly to which the front wheel is mounted. The front frame assembly is of course pivotally connected to the rear frame to permit lateral swinging movement of the former so that the vehicle can be steered.

A hydraulic fluid distribution terminal is fixed to the front frame assembly, the terminal being hydraulically connected to the pump and reservoir assembly on the rear frame via three flexible hoses (pressure, return and case drain). To reduce the rider's effort required to turn the front frame assembly during steering, each of the hoses is connected to the distribution terminal by a universal swivel fitting through which the hydraulic fluid flows.

The fittings provide relative pivoting movement between the ends of the hoses and the distribution terminal about two axes which are at right angles to each other. Preferably there are two hydraulic motors drivingly connected coaxially to the front wheel axle, one on each side of the front wheel; three hoses (pressure, return and case drain) connect each motor to the distribution terminal.

BRIEF DESCRIPTION OF THE DRAWINGS

FIG. 2 is a plan view of the vehicle of FIG. 1, with the power plant of rear frame assembly removed for each of illustration;

FIG. 3 is a sectional view taken generally on the line 3—3 of FIG. 2;

FIG. 4 is a rear view of the vehicle of FIG. 1;

FIG. 5 is a rear view of the vehicle during forward movement of the vehicle while negotiating a turn to the right; and FIG. 6 is a rear view of the vehicle on terrain which slopes downwardly and to the left, the vehicle being stationary or traversing the slope.

DETAILED DESCRIPTION OF AN EXEMPLARY EMBODIMENT

Figure 1:
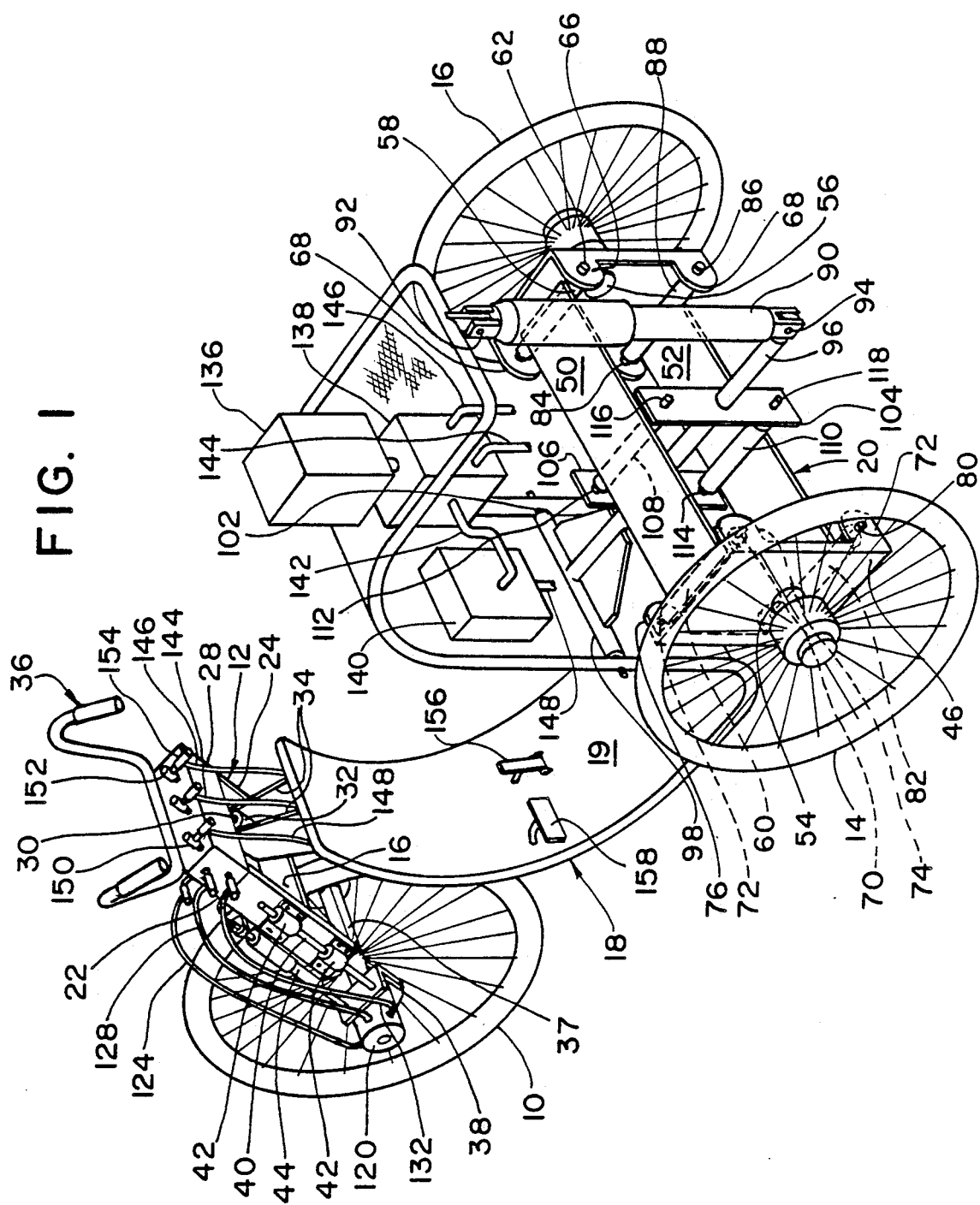
FIG. 1 is a schematic perspective view of a three-wheeled vehicle embodying the principles of the present invention.

As shown in the drawings the vehicle includes a single front ground-engaging wheel 10 rotatably mounted on a front frame assembly 12 and two rear ground-engaging wheels 14 and 16 connected to a rear frame assembly 18 by a parallelogram-type balancing assembly 20 which permits the rear frame assembly 18 and the rear wheels 14, 16 to assume the relative positions illustrated in FIGS. 4, 5 and 6. The front frame assembly 20 includes two transversely spaced apart side plates 22, 24, a cross plate 26 and the body of a hydraulic fluid distribution terminal 28 the function of which is described later. A pivotal connection between the front frame assembly 12 and the rear frame assembly, to allow steering of the vehicle, is provided in a conventional manner. As shown schematically, there may be a pin 30 fixed to the cross plate 26 on the longitudinal centerline of the vehicle and a sleeve 32 rotatably surrounding the pin 30, the sleeve 32 being fixed to the rear frame 18 by plates 34. Handlebars 36 for steering are fixed to the body of the distribution terminal 28.

In practice the rear frame assembly 18 will be adapted in any convenient manner to carry one or more persons. The assembly 18 in the schematically illustrated embodiment includes a horizontal platform portion 19 suitable for supporting one person in a standing position; a seat can be fitted in this location if desired.

The front wheel 10 is supported by the front frame assembly 12 in a manner which permits relative vertical movement between the two. In the schematically illustrated construction the axle 37 of the front wheel 10 extends between two brackets 38, one on each side of the wheel 10. A shaft 40 is fixed at its lower end to each bracket and extends upwardly so as to be longitudinally slidable in two bearings 42 which are fixed to the respective side plate 22 of the front frame assembly 12. The opposite ends of a shock absorber 44 are fixed, respectively, to each bracket 38 and the adjacent side plate 22.

The parallelogram-type balancing linkage 20 which connects the rear frame assembly 18 to the rear wheels 14, 16 includes left and right end members 46, 48 and upper and lower cross members 50, 52. The left rear wheel 14 is journalled in the left end member 46 and 54, and the right rear wheel 16 is journalled in the right end member 48 at 56. The opposite ends of the upper cross member 50 of the balancing linkage 20 are pivotally connected to the end members 46, 48 to permit relative rotation about axes which are parallel to the longitudinal axis of the rear frame assembly. This can be effected by shafts 58, 60 fixed to the opposite ends of the upper cross member 50, the opposite ends of one shaft 58 being journalled at 62, 64 in ears 66, 68 on the right end member 48 and the opposite ends of the other shaft 60 being journalled at 70, 72 in ears 74, 76 on the left end member 46. Similarly, left end of the lower cross member 52 of the linkage 20 is pivotally connected to the left end member 46 at 78, 80 by a shaft 82, and the right end of the lower cross member 52 is pivotally connected to the right end member 48 at 84, 86 by a shaft 88.

The assembly of the balancing linkage 20 and the rear wheels 14, 16 carried thereby is mechanically connected to the rear frame 18 by a shock absorber assembly which permits relative vertical movement between the two. In the illustrated embodiment the connection includes a vertical shock absorber 90 having its upper end pivoted to the rear frame 18 at 92 for pivoting movement about an axis transverse to the vehicle, i.e. an axis parallel to the axis of rotation of the rear wheels 14, 16. The lower end of the shock absorber 90 is pivoted at 94 to the rear end of a non-rotatable longitudinal shaft 96, lying on the vehicle centerline, for rotation about a similar transverse axis. The forward end of the shaft 96 is pivotally connected to the rear frame assembly 18 for similar pivoting movement. The latter connection includes a cross shaft 98 fixed to the shaft 96 and journalled at its ends 100, 102 in the rear frame assembly 18. The shaft 96 is attached to the balancing linkage 20 to complete the mechanical connection between the latter and the rear frame assembly. This is accomplished by means of two longitudinally spaced apart plates 104, 106 which are non-rotatably fixed to the shaft 96 and which are attached to the linkage 20 without interfering with the parallelogram operation of the latter. To this end, two longitudinal shafts 108, 110 are fixed to the upper and lower cross members 50 and 52 of the linkage 20, and the ends of these shafts 108, 110 are journalled in the plates 104, 106 at 112, 114, 116 and 118.

The drive system for hydraulically supplying rotary power to the front wheel 10 includes components carried by the front frame assembly 12 and components carried by the rear frame assembly 18, and the location of the various components has been selected to avoid complexities in construction and operation. Referring first to the actual driving of the front wheel 10, it has been found that a simple and economic arrangement results if two concentrically disposed hydraulic motors are used, one on each side of the front wheel 10, and if motor shafts are made unitary with each other. The front wheel 10 can then be mounted directly on the unitary shaft, thus utilizing the two motor shaft bearings as the bearings for the wheel 10 and eliminating the need to provide separate bearings for the latter. Such an arrangement is illustrated in the drawings wherein two hydraulic motors 120, 122 are shown fixedly attached to the previously-described brackets 38, with the shafts of the two motors extending toward each other and being unitized to form the previously-mentioned front wheel shaft 37. Pressure lines 124, 126, return lines 128, 130, and case drain lines 132, 134 provide the hydraulic flows required for operation of the motors 120, 122. These lines extend to the motors 120, 122 from the distribution terminal 28 which forms part of the front frame assembly 12.

The rear frame assembly 18 carries the other components of the hydraulic power system, including the hydraulic pump, reservoir, filters, heat exchangers, engine for driving the pump and fuel tank, all of which may be off-the-shelf components not requiring specific description here. As shown schematically in FIG. 1 these components include an air-cooled internal combustion engine 136 drivingly connected to the internal swash plate of a hydraulic pump 138 and a hydraulic fluid reservoir 140 connected to the pump 138 by a make-up line 142. A pressure line 144 and a return line 146 extend from the pump 138, and a case drain line 148 extends from the reservoir 140. The opposite ends of these three lines 144, 146, 148 connect with the distribution terminal 28 by means of swivel fittings 150 which reduce the amount of flexing of these relatively stiff lines as the front frame assembly 12 swings relative to the rear frame assembly during steering of the vehicle. Each fitting 150 includes a first part 152 which can pivot relative to the distribution terminal 28 about an axis parallel to the swing axis of the front frame assembly 12. A second part 154 of each swivel fitting 150 can pivot about an axis perpendicular to the pivot axis of the first part 152. This arrangement reduces the effort required by the operator to steer the vehicle, because the lines 144, 146, 148, while flexible, present resistance to flexing.

The distribution terminal 28 has interior channels (not shown) which provide fluid connections between the lines 144, 146 and 148 from the rear frame assembly and the lines to the hydraulic motors 120, 122. Thus, the pressure line 144 is in fluid communication with the pressure lines 124 and 126, the return line 146 is in fluid communication with the return lines 128 and 130, and the case drain line 148 is in fluid communication with the case drain lines 132 and 134.

Operator control over the driving force applied to the front wheel 10 is obtained by controlling the speed of the internal combustion engine 136 in the usual manner. In the interest of simplifying the drawings, the components of the control linkage are not illustrated, except that the general location of a foot-operated accelerator pedal is shown at 156.

A brake system is also provided, but again in the interest of simplifying the drawings, the components are not illustrated in the drawings, except that the general location of a foot-operated brake pedal is shown at 158. This pedal 158 can, for example, be connected to the piston of an off-the-shelf hydraulic piston pump carried by the rear frame assembly. Application of foot pressure to the pedal 158 results in generation of hydraulic pressure in the pump chamber and this pressure can be delivered by hydraulic lines to brake mechanisms located at each wheel. The hydraulic connection to the front wheel brake mechanism can conveniently be made via the distribution terminal 28 by providing a further internal channel in the latter, swivelly connecting a line from the foot pump to one end of the additional channel, and connecting a line from the opposite end of that channel to the front brake mechanism.

Operation of the vehicle to effect forward movement and braking is apparent from the above description of the drive and brake components. As stated previously, the provision of the distribution terminal 28 and the swivel connections 50 between the drive components on the rear frame assembly 18 and the drive components on the front frame assembly 12 allows the latter to be steered with minimum effort by the operator. It is not practical to provide a rear wheel drive system in the disclosed arrangement, because this would introduce complexities into the parallelogram-type balancing linkage and because of further complexities introduced by driving two rear wheels, one of which can slip during operation of the vehicle, from a single hydraulic pump.

FIGS. 4, 5 and 6 illustrate the operation of the parallelogram-type balancing linkage 20 during operation of the vehicle. It will be seen that in all configurations the upper and lower cross members remain parallel to each other, and the end members 46, 48 remain parallel to each other and parallel to the central plane 160 of the rear frame assembly 18. As shown in FIG. 4, when the vehicle is parked on or travelling over level terrain, the linkage 20 assumes a rectangular configuration, with the upper and lower cross members 50, 52 being parallel to the ground. When the vehicle is moving forward and negotiating a right turn, the operator leans to the right, i.e. into the turn, as he would on a bicycle or a two-wheeled motorcycle. As a result, the linkage 20, wheels 14, 16 and rear frame assembly 18 assume the positions shown in FIG. 5 whereby maximum traction is maintained between the rear wheels 14, 16 and the ground. Since the front wheel 10 is always parallel to the rear wheels, 14, 16, maximum traction is also maintained between the front wheel 10 and the ground. In a turn to the left, an opposite inclination of the linkage members 46, 48, 50, 52 and of the rear frame assembly will occur. FIG. 6 illustrates the configuration of the linkage 20 when the vehicle is parked on or travelling along a laterally inclined surface.

Movement of the linkage 20 between the different configurations, and intermediate configurations, illustrated in FIGS. 4, 5 and 6 does not require the use of an actuator (as disclosed for example in previously identified U.S. Pat. No. 4,126,322) to apply a force to the linkage, although the present invention does not exclude the presence of an actuator. Also, it is not required that a lock or latch mechanism be provided for fixing the configurations shown in FIGS. 4 and 6 when the vehicle is parked, although the invention does not exclude the presence of a lock or latch mechanism. The reason why such a mechanism is not required in order to prevent unintentional tilting of the linkage 20 from either the FIG. 4 position or the FIG. 6 position is that such movement can occur only if the distance between the points of contact of the rear wheels 14, 16 with the ground changes. Static friction between the wheels and the ground provides substantial resistance to any change in this dimension, and hence unintentional tilting of the linkage 20 is quite unlikely to occur.

Various modifications to the schematically illustrated vehicle can be made without departing from the scope of the invention.

What is claimed is:

1. A self-propelled three-wheeled vehicle comprising:
a front frame assembly carrying a single ground-engaging front wheel; a rear frame assembly; means pivotally connecting the front and rear frame assemblies to each other for relative swinging movement and said front wheel being fixed to swing with said front frame assembly so as to permit steering of the vehicle with said front wheel; two transversely-spaced-apart, ground-engaging rear wheels; a transversely extending parallelogram-type balancing linkage having opposite ends to which said rear wheels are rotatably mounted, said linkage being pivotally attached to said rear frame assembly and so constructed as to allow said frame assemblies and a rider on said rear frame assembly to lean into turns during forward movement of the vehicle and also to remain upright when the vehicle traverses or is parked on laterally inclined terrain; a power plant assembly carried on said rear frame assembly, said power plant assembly including an internal combustion engine drivingly connected to a hydraulic pump; a hydraulic motor fixed to said front frame assembly and having a shaft coaxial with and drivingly connected to said front wheel; a hydraulic fluid distribution terminal fixed to said front frame assembly so as to swing with the latter during steering of the vehicle; a first set of hydraulic lines for transmitting hydraulic fluid, each line having a first end connected to said pump and a second end connected to said distribution terminal via a universally swivelling fitting located at said terminal; and a second set of hydraulic lines for transmitting hydraulic fluid, each line having a first end connected to said motor and a second end connected to said distribution terminal and connected via an internal passage in said terminal with the second end of a single corresponding hydraulic line of said first set.

2. A vehicle as in claim 1 wherein there are two hydraulic motors located on opposite sides of said front wheel and a single rotatable output shaft common to both motors, and wherein said front wheel is fixed to said common shaft at a location between said motors.

3. A vehicle as in claim 1 wherein each of said swivelling fittings includes a first part which can pivot relative to said distribution terminal about an axis parallel to the swing axis of said front frame assembly and a second part which can pivot about an axis perpendicular to the pivot axis of said first part.

4. A vehicle as in claim 1 wherein said rear frame assembly includes a platform portion suitable for supporting a rider in a standing position, said vehicle further including a brake system having a foot-operated brake pedal accessible to the left foot of an operator standing on said platform portion and said vehicle further including a foot-operated engine accelerator pedal accessible to the right foot of an operator standing on said platform.

5. A vehicle as in claim 4 wherein said balancing linkage and said rear wheels carried thereby is mechanically connected to said rear frame assembly by shock absorbing means, which permits relative vertical movement between said balancing linkage and said platform which is carried by said rear frame assembly.

* * * * *